US012755131B2

(12) United States Patent
Zhou et al.

(10) Patent No.: US 12,755,131 B2
(45) Date of Patent: Oct. 6, 2026

(54) NORMALIZATION IN DEEP CONVOLUTIONAL NEURAL NETWORKS

(71) Applicant: HUAWEI TECHNOLOGIES CO., LTD., Shenzhen (CN)

(72) Inventors: Xiaoyun Zhou, Shenzhen (CN); Jiacheng Sun, Shenzhen (CN); Nanyang Ye, Cambridge (GB); Xu Lan, Cambridge (GB); Qijun Luo, Shenzhen (CN); Pedro Esperanca, Cambridge (GB); Fabio Maria Carlucci, Cambridge (GB); Zewei Chen, Shenzhen (CN); Zhenguo Li, Hong Kong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 700 days.

(21) Appl. No.: 18/180,841

(22) Filed: Mar. 8, 2023

(65) Prior Publication Data

US 2023/0237309 A1 Jul. 27, 2023

Related U.S. Application Data

(63) Continuation of application No. PCT/CN2020/114041, filed on Sep. 8, 2020.

(51) Int. Cl.

*G06F 7/00* (2006.01)
*G06F 17/00* (2019.01)

(Continued)

(52) U.S. Cl.

CPC ................. *G06N 3/04* (2013.01); *G06N 3/08* (2013.01)

(58) Field of Classification Search

CPC .................................. G06N 3/04; G06N 3/08

(Continued)

(56) References Cited

U.S. PATENT DOCUMENTS

| | | | | |
|---|---|---|---|---|
| 11,537,840 | B2 * | 12/2022 | Pau | G06N 3/0464 |
| 11,907,825 | B2 * | 2/2024 | Hechtman | G06N 3/098 |

(Continued)

FOREIGN PATENT DOCUMENTS

| | | | |
|---|---|---|---|
| CN | 106960243 | A | 7/2017 |
| CN | 107278310 | A | 10/2017 |

(Continued)

OTHER PUBLICATIONS

Salimans et al., "Weight Normalization: A Simple Reparameterization to Accelerate Training of Deep Neural Networks," arXiv:1602.07868v3, Total 11 pages (Jun. 2016).

(Continued)

*Primary Examiner* — Pavan Mamillapalli

(74) *Attorney, Agent, or Firm* — Leydig, Voit & Mayer, Ltd.

(57) ABSTRACT

A device for machine learning is provided, including a first neural network layer, a second neural network layer with a normalization layer arranged in between. The normalization layer is configured to, when the device is undergoing training on a batch of training samples, receive multiple outputs of the first neural network layer for a plurality of training samples of the batch, each output comprising multiple data values for different indices on a first dimension and a second dimension; group the outputs into multiple groups based on the indices on the first and second dimensions; form a normalization output for each group which are provided as input to the second neural network layer. According to the application, the training of a deep convolutional neural network with good performance that performs stably at (Continued)

different batch sizes and is generalizable to multiple vision tasks is achieved, thereby improving the performance of the training.

20 Claims, 5 Drawing Sheets

(51) Int. Cl.
*G06N 3/04* (2023.01)
*G06N 3/08* (2023.01)
(58) Field of Classification Search
USPC .......................................................... 706/25
See application file for complete search history.

(56) References Cited

U.S. PATENT DOCUMENTS

| | | | | |
|---|---|---|---|---|
| 2020/0134448 | A1* | 4/2020 | Sivakumar | G06N 3/0464 |
| 2021/0034972 | A1* | 2/2021 | Oh | G06N 3/08 |
| 2021/0110831 | A1* | 4/2021 | Shillingford | G06N 3/044 |
| 2022/0036517 | A1* | 2/2022 | Sandfort | G06T 5/70 |
| 2023/0343068 | A1* | 10/2023 | Yao | G06N 3/08 |

FOREIGN PATENT DOCUMENTS

| | | | |
|---|---|---|---|
| CN | 108921283 | A | 11/2018 |
| CN | 108960053 | A | 12/2018 |
| CN | 109272115 | A | 1/2019 |
| CN | 110291540 | A | 9/2019 |

OTHER PUBLICATIONS

Ren et al., "Normalizing the Normalizers: Comparing and Extending Network Normalization Schemes," Conference paper at ICLR 2017, arXiv:1611.04520v2 [cs.LG], Total 16 pages (Mar. 2017).
Ulyanov et al., "Instance Normalization: The Missing Ingredient for Fast Stylization," arXiv:1607.08022v3 [cs.CV] Total 6 pages (Nov. 2017).
Arpit et al., "Normalization Propagation: A Parametric Technique for Removing Internal Covariate Shift in Deep Networks," arXiv:1603.01431v6 [stat.ML], Total 11 pages (Jul. 12, 2016).
Goyal et al., "Accurate, Large Minibatch SGD: Training ImageNet in 1 Hour," arXiv:1706.02677v1 [cs.CV], Total 12 pages (Apr. 30, 2018).
Wu et al., "Group Normalization," arXiv:1803.08494v3, Total 10 pages (Jun. 11, 2018).
Li et al., "Positional Normalization," 33rd Conference on Neural Information Processing Systems (NeurIPS 2019), Vancouver, Canada, Total 13 pages (Jul. 2019).
Krizhevsky et al., "ImageNet classification with deep convolutional neural networks," Advances in Neural Information Processing Systems 25 (NIPS 2012), Total 9 pages (Jan. 2012).
He et al., "Deep Residual Learning for Image Recognition," 2016 IEEE Conference on Computer Vision and Pattern Recognition, Total 9 pages (Jun. 2016).
Kingma et al., "Adam: a Method for Stochastic Optimization," arXiv:1412.6980v9 [cs.LG], Total 15 pages (Jan. 30, 2017).
Zagoruyko et al., "Wide Residual Networks," arXiv:1605.07146v4 [cs.CV], Total 15 pages (Jun. 2017).
Oreshkin et al., "TADAM: Task dependent adaptive metric for improved few-shot learning," arXiv:1805.10123v4 [cs.LG], Total 13 pages (Jan. 2019).
Mnyals et al., "Matching Networks for One Shot Learning," arxiv.org, Cornell University Library, 201 Oline Library Cornell University Ithaca, NY 14853, Jun. 13, 2016, XP081350605, Total 12 pages (Dec. 2017).
Gidaris et al., "Dynamic Few-Shot Visual Learning without Forgetting," arXiv:1804.09458v1 [cs.CV] 25, Total 11 pages (Apr. 25, 2018).
Ioffe et al., "Batch Normalization: Accelerating Deep Network Training by Reducing Internal Covariate Shift," Proceedings of the 32nd International Conference on Machine Learning, arXiv:1502.03167, Total 9 pages (Submitted Feb. 2015).
Zhou et al., "Batch Group Normalization," Submitted to the 34th Conference on Neural Information Processing Systems (NeurIPS 2020), arXiv:2012.02782, Total 12 pages (Dec. 4, 2020).
Boyi et al., "Positional Normalization," arXiv:1907.04312v1, Total 21 pages (Jul. 9, 2019).
Ba et al., "Layer Normalization," arXiv:1607.06450v1, Total 14 pages (Jul. 21, 2016).
Qiao et al., "Rethinking Normalization and Elimination Singularity in Neural Networks," arXiv: 1911.09738v1, Total 10 pages (Nov. 21, 2019).
Yu et al., "Region Normalization for Image Inpainting," arXiv: 1911.10375v1, Total 9 pages (Nov. 23, 2019).
Summers et al., "Four Things Everyone Should Know To Improve Batch Normalization," Published as a conference paper at ICLR 2020, arXiv: 1906.03548v2, Total 18 pages (Feb. 14, 2020).
Dimitriou et al., "A New Look At Ghost Normalization," arXiv: 2007.08554v1, Total 10 pages (Jul. 20, 2020).

* cited by examiner

Figure 3

| Batch size | Group number | | | | | | | | | |
|---|---|---|---|---|---|---|---|---|---|---|
| | 512 | 256 | 128 | 64 | 32 | 16 | 8 | 4 | 2 | 1 |
| 128 | **77.008** | 75.936 | 76.256 | 76.096 | 75.984 | 75.504 | 76.016 | 75.632 | 75.520 | 75.360 |
| 2 | 63.968 | 66.000 | 68.160 | 70.064 | 71.856 | 72.832 | 74.928 | 75.120 | 75.968 | **76.096** |

Figure 4

| Normalization method | Batch size | | | | | | |
|---|---|---|---|---|---|---|---|
| | 128 | 64 | 32 | 16 | 8 | 4 | 2 |
| BN | 76.832 | 76.832 | 76.656 | 75.744 | 75.632 | 72.752 | 66.512 |
| IN | 72.096 | 71.136 | 69.984 | 71.136 | 70.432 | 70.656 | 70.512 |
| LN | 73.600 | 75.760 | 75.808 | 75.264 | 75.168 | 75.296 | 75.440 |
| GN | 75.776 | 76.544 | 75.952 | 76.496 | 75.632 | 76.240 | 75.872 |
| PN | 71.952 | 74.448 | 74.464 | 74.816 | 74.48 | 74.416 | 74.592 |
| Proposed BGN | **77.008** | **77.104** | **76.784** | **76.624** | **76.208** | **76.336** | **76.096** |

Figure 5(a)
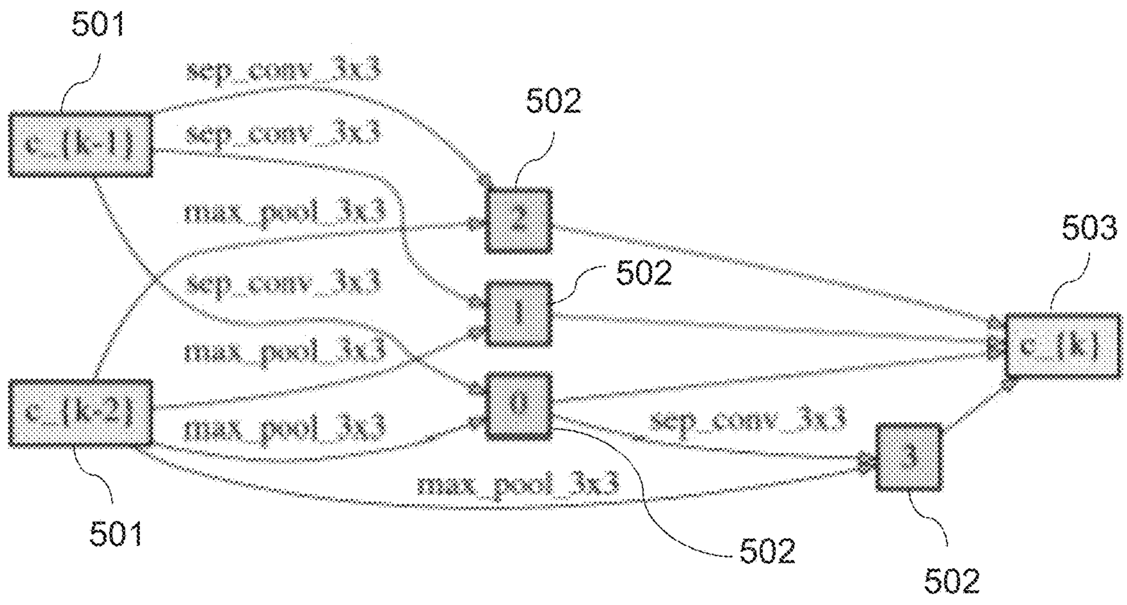
Figure 5(b)
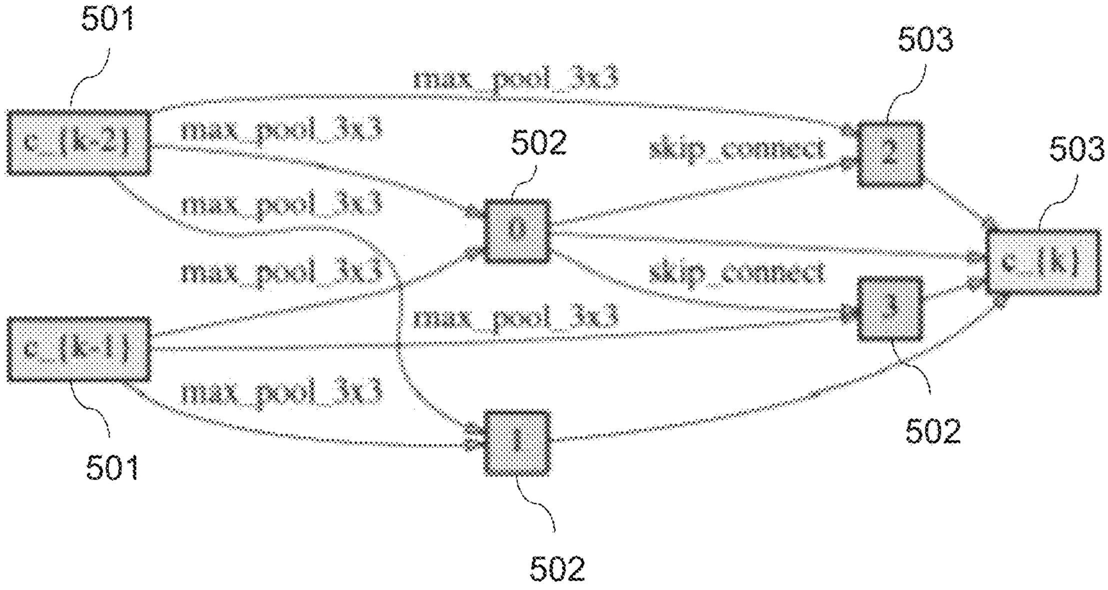
Figure 5

| Normalization layer | BN | IN | LN | GN | PN | Proposed BGN |
|---|---|---|---|---|---|---|
| accuracy | 97.33 | - | - | 94.78 | 94.41 | **97.40** |

| Accuracy | BN | IN | LN | GN | PN | Proposed BGN |
|---|---|---|---|---|---|---|
| robust accuracy | 48.79 | 48.45 | 44.15 | 44.38 | – | **49.64** |
| clean accuracy | 72.09 | 72.35 | 64.1 | 68.96 | – | **72.94** |

| Model | BN | IN | LN | GN | PN | Proposed BGN |
|---|---|---|---|---|---|---|
| 1-shot | 59.30±0.81 | 52.17±0.74 | 57.82±0.80 | 56.55±0.76 | 56.59±0.77 | **59.50 ± 0.81** |
| 5-shot | 76.22±0.62 | 70.49±0.62 | 74.87±0.61 | 73.20±0.65 | 73.89±0.60 | **76.32±0.63** |

NORMALIZATION IN DEEP CONVOLUTIONAL NEURAL NETWORKS

CROSS-REFERENCE TO RELATED APPLICATIONS

This application is a continuation of International Application No. PCT/CN2020/114041, filed on Sep. 8, 2020, the disclosure of which is hereby incorporated by reference in its entirety.

FIELD OF THE INVENTION

Embodiments of this invention relate to the processing of training samples in a Deep Convolutional Neural Network (DCNN), for example in vision tasks such as image classification.

BACKGROUND

Deep Convolutional Neural Networks (DCNN) are a popular method for vision tasks including image classification, object detection and semantic segmentation. DCNNs usually comprise convolutional layers, normalization layers and activation layers. Normalization layers are important in improving performance and speeding up the training process.

However, the training of DCNNs is generally difficult and time consuming. The performance of previous training methods is also limited.

Batch Normalization (BN), as described in Sergey Ioffe and Christian Szegedy, "Batch normalization: Accelerating deep network training by reducing internal covariate shift", International Conference on Machine Learning, pages 448-456, 2015, normalizes the feature map with the mean and variance calculated along with the batch, height, and width dimension of a feature map and then re-scales and re-shifts the normalized feature map to maintain the representation ability of a DCNN. Based on BN, many normalization methods for other tasks have been proposed to calculate the mean and variance statistics along different dimensions. For example, Layer Normalization (LN), as described in Jimmy Lei Ba, Jamie Ryan Kiros, and Geoffrey E Hinton, "Layer normalization", NIPS Deep Learning Symposium, 2016, was proposed for calculating the statistics along the channel, height and width dimension for Recurrent Neural Network (RNN). Weight Normalization (WN), as described in Tim Salimans and Durk P Kingma, "Weight normalization: A simple reparameterization to accelerate training of deep neural networks", Advances in neural information processing systems, pages 901-909, 2016, was proposed to parameterize the weight vector for supervised image recognition, generative modelling, and deep reinforcement learning. Divisive Normalization, as described in Mengye Ren, Renjie Liao, Raquel Urtasun, Fabian H Sinz, and Richard S Zemel. "Normalizing the normalizers: Comparing and extending network normalization schemes", International Conference on Learning Representations, 2016, which includes BN and LN as special cases was proposed for image classification, language modeling and super-resolution. Instance Normalization (IN), as described in Dmitry Ulyanov, Andrea Vedaldi, and Victor Lempitsky. "Instance normalization: The missing ingredient for fast stylization", arXiv preprint arXiv:1607.08022, 2016, where the statistics were calculated from the height and width dimension, was proposed for fast stylization. Instead of calculating the statistics from data, Normalization Propagation, as described in Devansh Arpit, Yingbo Zhou, Bhargava Kota, and Venu Govindaraju, "Normalization propagation: A parametric technique for removing internal covariate shift in deep networks", International Conference on Machine Learning, pages 1168-1176, 2016, estimated the data independently from the distribution in layers. Group Normalization, as described in Yuxin Wu and Kaiming He, "Group normalization", Proceedings of the European Conference on Computer Vision (ECCV), pages 3-19, 2018, divided the channels into groups and calculated the statistics for each grouped channel, height and width dimension, showing stability to batch sizes. Positional Normalization (PN), as described in Boyi Li, Felix Wu, Kilian Q Weinberger, and Serge Belongie, "Positional normalization", Advances in Neural Information Processing Systems, pages 1620-1632, 2019, was proposed to calculate the statistics along the channel dimension for generative networks.

BN, IN, LN, GN and PN share the same four steps: divide the intermediate feature map into multiple feature groups; calculate the mean and variance of each feature group; use the calculated mean and variance of each feature group to normalize the corresponding feature group; and use extra two trainable parameters for each channel of the intermediate feature map to recover the DCNN representation ability. The main difference between BN, IN, LN, GN and PN is the division of feature groups.

Among these normalization methods, BN can usually achieve good performance at large batch sizes. However, its performance may degrade at small batch sizes. GN enjoys a greater degree of stability at different batch sizes, while slightly under-performs BN at large batch sizes. Other normalization methods, including IN, LN and PN perform well in specific tasks, but are usually less generalizable to multiple vision tasks than BN and under-perform at large batch sizes.

It is desirable to develop a method for normalization that overcomes such problems.

SUMMARY

According to one aspect there is provided a device for machine learning, the device comprising one or more processors configured to implement a first neural network layer, a second neural network layer and a normalization layer arranged between the first neural network layer and the second neural network layer, the normalization layer being configured to, when the device is undergoing training on a batch of training samples: receive multiple outputs of the first neural network layer for a plurality of training samples of the batch, each output comprising multiple data values for different indices on a first dimension and on a second dimension, the first dimension representing a channel dimension; group the outputs into multiple groups in dependence on the indices on the first and second dimensions to which they relate; form a normalization output for each group; and provide the normalization outputs as input to the second neural network layer.

This may allow for the training of a DCNN with good performance, that performs stably at different batch sizes, and that is generalizable to multiple vision tasks. This may also speed up and improve the performance of DCNN training.

The said second dimension may represent one or more spatial dimensions. For example, the height and width of a feature map of an image. This may provide an effective way of performing machine learning on spatially extended samples.

The step of forming a normalization output for each group may comprise computing an aggregate statistical parameter over the outputs in that group. Such a parameter may conveniently be used to assist in the training of subsequent neural network layers.

The step of forming a normalization output for each group may comprise computing a mean and a variance over the outputs in that group. One or both of these quantities may be useful in training subsequent neural network layers.

The step of grouping the outputs may comprise allocating each output to only a single one of the groups. In this way each output may not be overrepresented in the training of subsequent neural network layers.

The step of grouping the outputs may comprise allocating all outputs relating to a common index or point on the first dimension and to a common index or point on the second dimension to the same group. Thus such a group may comprise outputs that are related by having those indices or points in common.

The step of grouping the outputs may comprise allocating outputs relating to a common batch to different groups. Including the batch dimension in the statistic calculation may further improve the performance and generalizability of normalization, The step of grouping the outputs may comprise allocating outputs to different groups in dependence on the point or index on the first dimension to which they relate. This may allow aggregated values derived from that group to provide information about outputs having that point or index.

The step of grouping the outputs may comprise allocating outputs to different groups in dependence on the point or index on the second dimension to which they relate. This may allow aggregated values derived from that group to provide information about outputs having that point or index.

The normalization layer may be configured to: receive a control parameter; compare the control parameter to a predetermined threshold; and in dependence on that parameter determine how, during the said grouping step, to allocate outputs to different groups in dependence on the points in the first dimension and the second dimension to which they relate. Selecting the size of feature group that is used to calculate the statistic may further improve the stability of normalization to different batch sizes.

The device may be configured to form the control parameter in dependence on the number of training samples in the batch. For example, when the batch size is small, a small G can be used, while when the batch size is large, a large G can be used.

The outputs may be feature maps formed by the first neural network layer. This may allow the device to be used in computer vision and image classification tasks.

The device may be configured to train the second neural network layer in dependence on the normalization outputs.

According to a second aspect there is provided a method for training, on a batch of training samples, a device for machine learning comprising a first neural network layer, a second neural network layer and a normalization layer arranged between the first neural network layer and the second neural network layer, the method comprising: receiving multiple outputs of the first neural network layer for a plurality of training samples of the batch, each output comprising multiple data values for different indices on a first dimension and on a second dimension, the first dimension representing a channel dimension; grouping the outputs into multiple groups in dependence on the indices on the first and second dimensions to which they relate; forming a normalization output for each group; and providing the normalization outputs as input to the second neural network layer.

This method may allow for the training of a DCNN with good performance, that performs stably at different batch sizes, and that is generalizable to multiple vision tasks. The method may speed up and improve the performance of DCNN training.

BRIEF DESCRIPTION OF THE FIGURES

The present invention will now be described by way of example with reference to the accompanying drawings.

In the drawings:

FIG. 3 shows the Top1 validation accuracy of an implementation of BGN on ImageNet classification with ResNet-50 model. The hyper-parameter G is set to be from 512 to 1.

FIG. 4 shows the Top1 validation accuracy in implementations of BN, IN, LN, GN, PN and BGN on ImageNet classification with ResNet-50 model and with different batch sizes from 128 to 2.

FIG. 5 shows an example of the architecture in the DARTS search space comprising of a sequence of cells, where each cell is a directed acyclic graph with nodes representing feature maps and edges representing network operations, such as convolutions or pooling layers. An example of a normal cell is shown in FIG. 5(*a*) and an example of a reduction cell is shown in FIG. 5(*b*) in the DARTS search space.

DETAILED DESCRIPTION

Figure 1:
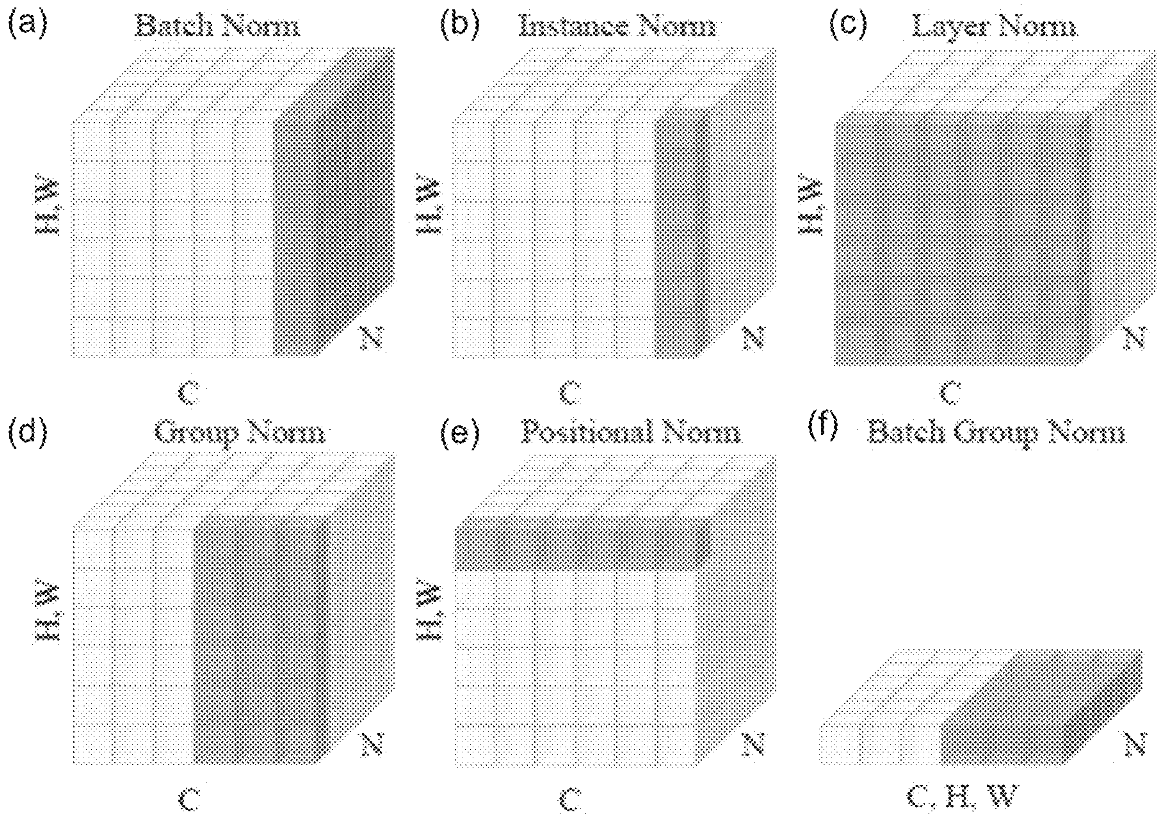
FIG. 1 schematically illustrates the difference between BN, IN, LN, GN, PN and the Batch Group Normalisation (BGN) approach described herein, with respect to the dimensions along which the statistics are computed. Each subplot shows a feature map tensor, with N as the batch axis, C as the channel axis, and (H, W) as the spatial axes. The shaded pixels are used to compute the statistics. Figures, 1(*a*), 1(*b*), 1(*c*), 1(*d*) and 1(*e*) show examples of the BN, IN, LN, GN and PN methods respectively. The approach of the BGN method is shown in FIG. 1(*f*).

Described herein is a normalization approach for the training of deep convolutional neural networks that has been shown in some implementations to achieve better performance, stability and generalizability than previous approaches.

The method described herein may be implemented by a machine leaning device having a processor, the processor being configured to implement a first neural network layer, a second neural network layer and a normalization layer arranged between the first neural network layer and the second neural network layer.

As will be described in more detail below, the normalization layer may be configured to, when the device is undergoing training on a batch of training samples, receive multiple outputs of the first neural network layer for a plurality of training samples of the batch, each output comprising multiple data values for different indices on a first dimension and on a second dimension, the first dimension representing a channel dimension.

Preferably, the outputs are feature maps formed by the first neural network layer, as described in the examples below.

In one example, the first dimension is the channel C of the feature map. The second dimension represents one or more spatial dimensions of the feature map. For example, the second dimension may represent the height (H) and/or width (W) of the feature map.

The outputs are then grouped into multiple groups in dependence on the indices on the first and second dimensions to which they relate and a normalization output is formed for each group. Advantageously, the step of grouping the outputs may also comprise allocating outputs relating to a common batch to different groups.

In one example, consider a feature map output by previous layers of the network, $F_{N\times C\times H\times W}$, where N is the batch size of the feature map.

The channel, height and width dimensions are first merged into a new dimension to give $F_{N\times M}$, where $M=C\times H\times W$.

The step of forming a normalization output for each group preferably comprises computing an aggregate statistical parameter over the outputs in that group, such as the mean and variance.

In this example, the mean $\mu_g$ and variance $$\delta_g^2$$

are calculated along the batch and new dimension (C, H, W) as:

$$\mu_g = \frac{1}{N\times S}\sum_{n=1}^{N}\sum_{m=(g-1)\cdot S+1}^{g\cdot S} f_{n,m} g \in [1, G] \quad (1)$$

$$\delta_g^2 = \frac{1}{N\times S}\sum_{n=1}^{N}\sum_{m=(g-1)\cdot S+1}^{g\cdot S} (f_{n,m}-\mu_g)^2,\ g \in [1, G] \quad (2)$$

where G is the number of groups that the new dimension is divided and is a hyper-parameter, S=M/G is the number of instances inside each divided feature group.

The hyper-parameter G may be used to control the number of feature instances or the size of feature groups for calculating the statistics.

The normalization layer may therefore be further configured to receive a control parameter (i.e. hyper-parameter G) and compare the control parameter to a predetermined threshold. In dependence on that parameter, the normalization layer may determine how, during the said grouping step, to allocate outputs to different groups in dependence on the points in the first dimension and the second dimension to which they relate.

The device may be configured to form the parameter G in dependence on the number of training samples in the batch.

When the batch size of a DCNN is determined, a full batch size may cause confused gradients while a small batch size may cause noisy gradients. Good statistics in normalization should cover a proper amount of feature instances. The method described herein may therefore introduce the feature group and the hyper-parameter G to control the number of feature instances or the size of feature groups for calculating the statistics. For example, when the batch size is small, a small G can be used to combine the whole new dimension into statistic calculation, while when the batch size is large, a large G can be used to split the new dimension into small pieces for calculating the statistics. Then for $g\in[1,G]$, the feature map is normalized as:

$$\hat{f}_{n,m} = \frac{f_{n,m}-\mu_g}{\sqrt{\delta_g^2+\epsilon}},\ n \in [1, N],\ m \in [(g-1)\cdot S+1,\ g\cdot S] \quad (3)$$

where $\in$ is a small number added for division stability. $F_{N\times M}$ is then split back to $F_{N\times C\times H\times W}$, following BN, IN, LN, GN and PN, in order to maintain the representation ability of a DCNN. Extra trainable parameters are added for each feature channel:

$$f'_{n,c,h,w} = \gamma_c \hat{f}_{n,c,h,w} + \beta_c,\ n \in [1, N],\ c \in [1, C],\ h \in [1, H],\ w \in [1, W] \quad (4)$$

In BN, $\mu_c$ and $$\delta_c^2$$

used in the testing stage are the moving average of that in the training stage. The method described herein may use this policy as well, as a normalization method should preferably be batch-size independent. IN, LN, GN and PN generally use the statistics calculated directly from the testing stage.

The normalization layer therefore groups the outputs into multiple groups in dependence on the indices on the first and second dimensions to which they relate. A normalization output is then formed for each group. The normalization outputs are then provided as input to the second neural network layer.

The outputs may be grouped in different ways. The step of grouping the outputs may comprise allocating each output to only a single one of the groups. The step of grouping the outputs may comprise allocating all outputs relating to a common point on the first dimension and to a common point on the second dimension to the same group.

In another example, the step of grouping the outputs comprises allocating outputs to different groups in dependence on the point on the first dimension to which they relate. Alternatively or additionally, the step of grouping the outputs may comprise allocating outputs to different groups in dependence on the point on the second dimension to which they relate.

In a preferred implementation, the step of grouping the outputs comprises allocating outputs relating to a common batch to different groups. Therefore, groups may additionally be formed along the batch dimension (N). Referring to the representation shown in FIG. 1(*f*), each group may extend all the way along the N axis, as shown in this figure, or there could be sub-groups on the N axis as well as on the (C, H, W) axis. In other words, in the preferred implementation where the (C, H, W) dimensions are condensed onto a single axis, the group is shown as being for all N (that is, it goes all the way across the N axis). However, the samples could also be grouped along the N axis (batch grouping). Preferably, in such groups, there are multiple samples in each group.

The difference between BN, IN, LN, GN, PN and the method described herein, which will be referred to below as Batch Group Normalization (BGN), with respect to the dimensions along which the statistics are computed is illustrated in FIG. 1. Figures, 1(*a*), 1(*b*), 1(*c*), 1(*d*), 1(*e*) and 1(*f*) show examples of the BN, IN, LN, GN and PN methods respectively. An example of the approach of the BGN method is shown in FIG. 1(*f*). Each subplot shows a feature map tensor, with N as the batch axis, C as the channel axis, and (H, W) as the spatial axes. The shaded pixels are used to compute the statistics.

Figure 2:
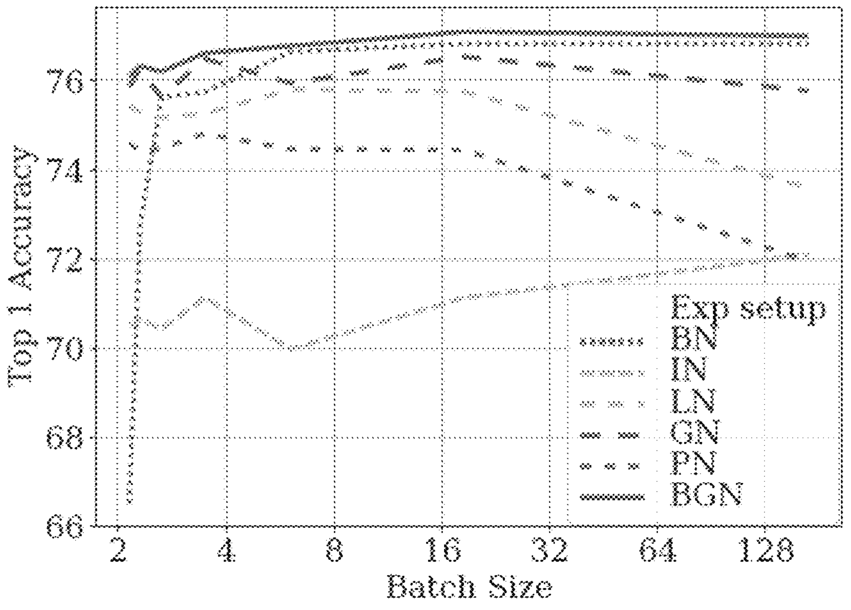
FIG. 2 shows results comparing the method described herein with prior methods. The Top1 accuracy of training ResNet-50 on ImageNet is shown, with different batch sizes, and with BN, IN, LN, GN, PN and the BGN described herein as the normalization layer.

FIG. 2 shows the Top1 accuracy of implementations training ResNet-50 on ImageNet, with different batch sizes, and with BN, IN, LN, GN, PN and BGN as the normalization layer. Without adding trainable parameters, using extra information or requiring extra computation, BGN achieves both good performance and stability at different batch sizes.

One application of the method described herein is in image classification. In the example described below, ImageNet (see Alex Krizhevsky, Ilya Sutskever, and Geoffrey E Hinton, "Imagenet classification with deep convolutional neural networks", Advances in neural information processing systems, pages 1097-1105, 2012) was used which contains 1:28M training images and 50000 validation images. The model used in the examples is ResNet-50 (see Kaiming He, Xiangyu Zhang, Shaoqing Ren, and Jian Sun, "Deep residual learning for image recognition", Proceedings of the IEEE conference on computer vision and pattern recognition, pages 770-778, 2016) where around 50 convolutional layers followed by normalization and activation layers are stacked with residual learning. 8 GPUs were used in the ImageNet experiments. The gradients used for backpropagation were averaged across 8 GPUs, while the mean and variance used in BN and BGN were calculated within each GPU independently. $\gamma_c$ and $\beta_c$ were initialized as 1 and 0 respectively, while all other trainable parameters were initialized in the same way as in He et al. 120 epochs were trained with the learning rate decayed by 10× at the 30th, 60th, and 90th epoch. The initial learning rates for the experiments with batch sizes of 128, 64, 32, 16, 8, 4 and 2 were 0.4, 0.2, 0.1, 0.05, 0.025, 0.0125 and 0.00625 respectively, following the method described in Priya Goyal, Piotr Dollár, Ross Girshick, Pieter Noordhuis, Lukasz Wesolowski, Aapo Kyrola, Andrew Tulloch, Yangqing Jia, and Kaiming He, "Accurate, large minibatch sgd: Training imagenet in 1 hour.", arXiv preprint arXiv: 1706.02677, 2017. Stochastic Gradient Descent (SGD) was used as the optimizer. A weight decay of $10^{-4}$ was applied to all trainable parameters.

For the validation, each image was cropped into 224×224 patches from the center. The Top1 accuracy is reported as the evaluation criterion. All experiments were trained under the same programming implementation, but replacing the normalization layer according to BN, IN, LN, GN, PN, and BGN respectively.

To explore the hyper-parameter G, BGN with a group number of 512, 256, 128, 64, 32, 16, 8, 4, 2 and 1 respectively were used as the normalization layer in ResNet-50 for ImageNet classification. The largest (according to GPU memory) and smallest batch size in the experiments (128 and 2) were tested. The Top1 accuracy of the validation dataset is shown in FIG. 3.

In general, the results demonstrate that a large G (e.g. 512) is more suitable for a large batch size (e.g. 128) while a small G (e.g. 1) is more suitable for a small batch size (e.g. 2). This demonstrates that the number of feature instances affects the statistic calculation in normalization. Suitably, when the batch size is large, a large G may be used to split the new dimension to maintain proper number of feature instances for statistic calculation. Suitably, when the batch size is small, a small G may be used to combine the new dimension to maintain proper number of feature instances for statistic calculation.

The results of further experiments are shown in FIG. 4, where BN, IN, LN, GN, PN, and BGN were used as the normalization layer in ResNet-50, with a batch size of 128, 64, 32, 16, 8, 4 and 2 respectively. The group number in GN was set as 32. The group number in BGN was set to be 512, 256, 128, 64, 16, 2 and 1 for batch sizes of 128, 64, 32, 16, 8, 4 and 2 respectively. G for the largest and smallest batch size were chosen according to FIG. 3, whereas G for other batch sizes was chosen using interpolation. FIG. 4 shows the Top1 accuracy for each method. In these examples, BGN out-performs the previous methods at all different batch sizes. BN's performance degrades quickly at small batch sizes. IN generally does not perform well on ImageNet classification.

The following example demonstrates the application of the method for image classification on the CIFAR-10 (Canadian Institute for Advanced Research) dataset with NAS (Neural Architecture Search). This demonstrates that as well as manually designed and regular neural architectures, BGN is also applicable to automatically-designed and less-regular neural architectures. The following example uses cell-based architectures designed automatically with NAS, specifically DARTS, as described in Hanxiao Liu, Karen Simonyan, and Yiming Yang. DARTS: Differentiable architecture search", International Conference on Learning Representations, 2019. For DARTS, normalization methods were used for both the searching and training.

As shown in FIGS. 5(*a*) and 5(*b*), the family of architectures searched comprises of a sequence of cells, where each cell is a directed acyclic graph with nodes representing feature maps and edges representing network operations, such as convolutions or pooling layers. An example of a normal cell is shown in FIG. 5(*a*) and an example of a reduction cell is shown in FIG. 5(*b*) in the DARTS search space. Each cell has two input nodes 501, four internal nodes 502 and one output node 503. Multiple cells are connected in a feedforward fashion to create a deep neural network.

Given a set of possible operations, DARTS encodes the architecture search space with continuous parameters to form a one-shot model and performs searching by training the one-shot model with bi-level optimization, where the model weights and architecture parameters are optimized with training data and validation data alternatively.

Figures 6, 7, 8, 9:
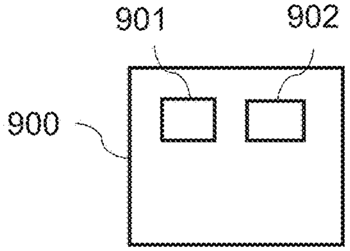
FIG. 6 shows the validation accuracy on CIFAR-10 with using BN, IN, LN, GN, PN and the proposed BGN in DARTS for the search and evaluation phase.
FIG. 7 shows the robust and clean validation accuracy of adversarial training with BN, IN, LN, GN, PN and BGN as the normalization layer in WideResNet. The clean accuracy is evaluated on the clean dataset while the robust accuracy is evaluated on the PGD attacked data.
FIG. 8 shows the mean accuracy of the 5-way 1-shot and 5-shot Free Shot Learning tasks on miniImageNet of Imprinted Weights with using ResNet-12 as a backbone network. The normalization layer is replaced with one according to BN, IN, LN, GN, PN and BGN. The mean accuracy of 600 randomly generated test episodes with 95% confidence intervals is reported.
FIG. 9 shows an example of a device for machine learning comprising a processor configured to implement a first neural network layer, a second neural network layer and a normalization layer arranged between the first neural network layer and the second neural network layer.

For the DARTS training, the same experimental settings were used as in Lui et al. The BN layers in DARTS were replaced with the normalization layers of IN, LN, GN, PN and BGN in both the search and evaluation stages. In this implementation, the method searched for 8 cells in 50 epochs with batch size 64 and initial number of channels as 16. SGD was used to optimize the model weights with initial learning rate 0:025, momentum 0:9 and weight decay $3\times10^{-4}$. Adam, as described in Diederik P Kingma and Jimmy Ba, "Adam: A method for stochastic optimization", arXiv preprint arXiv:1412.6980, 2014, was used to optimize architecture parameters with initial learning rate $3\times10^{-4}$, momentum (0:5; 0:999) and weight decay $10^{-3}$. A network of 20 cells and 36 initial channels was used for evaluation to ensure a comparable model size as other baseline models. The whole training set was used to train the model for 600 epochs with batch size 96 to ensure convergence. For GN, the configuration G=32 was used, while BGN, the configuration G=256 was used. Other hyper-parameters were set to be the same as those in the search stage. The best 20-cell architecture searched on CIFAR-10 by DARTS was trained from scratch with corresponding normalization methods used during the search phase. The validation accuracy of each method is shown in FIG. 6. IN and LN fails to converge while the BGN out-performs GN, PN and BN. These results demonstrate that, in some implementations, BGN is generalizable to NAS for both search and evaluation.

DCNNs have been known to be vulnerable to malicious perturbed examples, known as adversarial attacks. Adversarial training has been proposed to counter this problem. In the following example, BGN was applied to adversarial training and its results compared to BN, IN, LN, GN, and PN. The WideResNet, as described in Sergey Zagoruyko and Nikos Komodakis, "Wide residual networks", Edwin R. Hancock, Richard C. Wilson and William A. P. Smith, editors, Proceedings of the British Machine Vision Conference (BMVC), pages 87.1-87.12. BMVA Press, September 2016, with the depth set as 10 and the wide factor set as 2 is used for image classification tasks on the CIFAR-10 dataset. The neural network was trained and evaluated against a four-step Projected Gradient Descent (PGD) attack. For the PGD attack, the step size was set as 0.00784, and the maximum perturbation norm as 0.0157. 200 epochs were trained until convergence. Due to the specialty of adversarial training, G=128 was used in GN and BGN. This divides images into patches, which can help to improve the robustness by breaking the correlation of adversarial attacks in different image blocks and constraining the adversarial attacks on the features within a limited range. The Adam optimizer was used with a learning rate of 0.01. The robust and clean accuracy of training WideResNet with BN, IN, LN, GN, PN and BGN as the normalization layer are shown in FIG. 7. The robust accuracy is more important than the clean accuracy in judging an adversarial network. PN experiences convergence difficulty and fails to converge. In this implementation, BGN out-performs the other methods.

The BGN method may also be implemented as part of a Few Shot Learning (FSL) task. FSL aims to train models capable of recognizing new, previously unseen categories using only limited training samples. A training dataset with sufficient annotated samples comprises base categories. The test dataset contains C novel classes, each of which is associated with only a few, K, labelled samples (for example, 5 or fewer samples) that comprise the support set, while the remaining unlabelled samples comprise the query set and are used for evaluation. This may also be referred to as a C-way K-shot FSL classification problem.

In one example, the imprinted weights model, as described in Hang Qi, Matthew Brown, and David G Lowe, "Low-shot learning with imprinted weights", Proceedings of the IEEE conference on computer vision and pattern recognition, pages 5822-5830, 2018, was used. At training time, a cosine classifier was learned on top of feature extraction layers and each column of classifier parameter weights can be regarded as a prototype for the respective class. At test time, a new class prototype (new column of classifier weight parameters) was defined by averaging the feature representation of support images, and the unlabelled images were classified via a nearest neighbor strategy. Settings including 5-way 1-shot and 5-way 5-shot were tested for the ResNet-12 backbone (see Boris Oreshkin, Pau Rodríguez López, and Alexandre Lacoste, "Tadam: Task dependent adaptive metric for improved few-shot learning", NeurIPS, 2018) on miniImageNet (see Oriol Vinyals, Charles Blundell, Timothy Lillicrap, Daan Wierstra, et al., "Matching networks for one shot learning", NeurIPS, 2016. In this example, the training protocol described in Spyros Gidaris and Nikos Komodakis, "Dynamic few-shot visual learning without forgetting", CVPR, 2018, was used. The BGN model was optimized using SGD with Nesterov momentum set to 0:9, weight decay to 0.0005, mini-batch size to 256, and 60 epochs. All input images were resized to 84×84. The learning rate was initialized to 0.1, and changed to 0.006, 0.0012, and 0.00024 at the 20th, 40th and 50th, respectively. The mean and variance accuracy of replacing the normalization layers in Imprinted Weights to BN, IN, LN, GN, PN and the proposed BGN, of training on miniImageNet, and of the 5-way 1-shot and 5-shot tasks are shown in FIG. 8. In these implementations, BGN outperformed the other methods, indicating the generalizability of BGN when very limited labelled data is available.

A machine learning device 900 configured to implement the BGN method is schematically illustrated in FIG. 9. The device 900 may be implemented on a device, such as a laptop, tablet, smart phone or TV.

The device 900 comprises a processor 901 configured to process the datasets in the manner described herein. For example, the processor 901 may be implemented as a computer program running on a programmable device such as a Central Processing Unit (CPU). The system 200 comprises a memory 902 which is arranged to communicate with the processor 901. Memory 902 may be a non-volatile memory. The processor 901 may also comprise a cache (not shown in FIG. 9), which may be used to temporarily store data from memory 902. The system may comprise more than one processor and more than one memory. The memory may store data that is executable by the processor. The processor may be configured to operate in accordance with a computer program stored in non-transitory form on a machine readable storage medium. The computer program may store instructions for causing the processor to perform its methods in the manner described herein.

Figure 10:
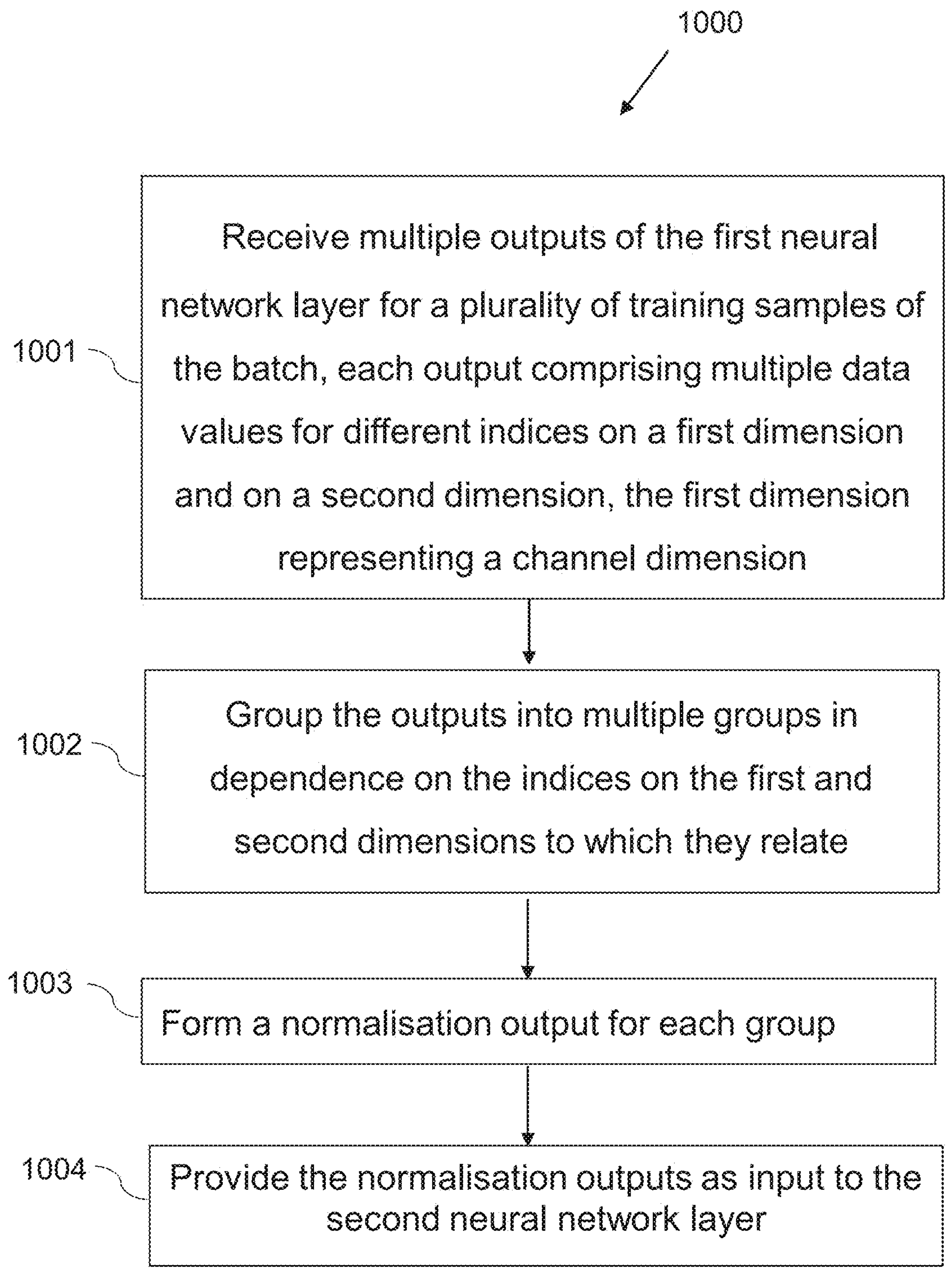
FIG. 10 illustrates an example of a method for training, on a batch of training samples, a device for machine learning comprising a first neural network layer, a second neural network layer and a normalization layer arranged between the first neural network layer and the second neural network layer.

FIG. 10 summarizes a method 1000 for training, on a batch of training samples, the device for machine learning comprising a first neural network layer, a second neural network layer and a normalization layer arranged between the first neural network layer and the second neural network layer. At step 1001, the method comprises receiving multiple outputs of the first neural network layer for a plurality of training samples of the batch, each output comprising multiple data values for different indices on a first dimension and on a second dimension, the first dimension representing a channel dimension. The outputs may be feature maps formed by the first neural network layer. At step 1002, the method comprises grouping the outputs into multiple groups in dependence on the indices on the first and second dimensions to which they relate. At step 1003, the method comprises forming a normalization output for each group. At step 1004, the method comprises providing the normalization outputs as input to the second neural network layer. The method may further comprise training the second neural network layer in dependence on the normalization outputs.

As described above, the method divides the intermediate feature map into feature groups in a different way. In the preferred implementation, each intermediate feature map has four dimensions including the batch, height, width and channel dimension. The height, width and channel dimensions are first merged into one dimension and then this new dimension is divided into multiple feature groups. The hyper-parameter G is used to control how many groups the intermediate feature map is divided into. The statistics (e.g. mean and variance) are then calculated for each feature group across the entire mini-batch.

The normalization method described herein exhibits good performance, performs stably at different batch sizes, and is generalizable to multiple vision tasks. It does not use additional trainable parameters, information across multiple layers or iterations, or extra computation. It can calculate the mean and variance statistics from batch and grouped (channel, height and width) dimensions and may use a hyper-parameter G to control the size of divided feature groups. This normalization method can, in some implementations, speed up and improve the performance of DCNN training.

The method can advantageously consider the batch dimension in the statistic calculation (i.e. include the batch dimension in the mean and variance calculation), and can control the size of feature group used for statistic calculation to be moderate (i.e. neither too large or too small). Including the batch dimension in the statistic calculation may further improve the performance and generalizability of normalization, while selecting the size of feature group that is used to calculate the statistic may further improve the stability of normalization to different batch sizes.

In the method described herein, no extra trainable parameters or calculations or multi-iteration/multi-layer information are used. The method can be used jointly with other techniques using extra trainable parameters or calculations or multi-iteration/multi-layer information to further improve the performance. It is therefore intuitive to implement, is orthogonal to and can be used in addition to many methods to further improve performance.

In some implementations, BGN outperforms BN by almost 10% on ImageNet classification with a small batch size. It has been shown in some implementations to outperform BN, IN, LN, GN and PN on image classification, Neural Architecture Search, adversarial learning, Few Shot Learning and Un-supervised Domain Adaption tasks.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A device for machine learning configured to implement a deep convolutional neural network (DCNN), the device comprising:

one or more processors;

a first neural network layer;

a second neural network layer; and a normalization layer arranged between the first neural network layer and the second neural network layer;

wherein when the device is undergoing training on a batch of training samples, the one or more processors cooperate with the normalization layer and cause the normalization layer to:

receive multiple outputs of the first neural network layer for a plurality of training samples of the batch of training samples, wherein the multiple outputs comprise a plurality of feature maps produced by the first neural network layer, wherein each output comprises multiple data values for indices of a feature map among the plurality of feature maps along a first dimension and a second dimension, wherein the first dimension represents a channel dimension that indexes a plurality of channels, each channel corresponding to a respective feature map in the plurality of feature maps produced by the first neural network layer, and wherein the second dimension represents at least one spatial dimension of each feature map in the plurality of feature maps, including a height dimension and/or a width dimension;

group the outputs into multiple groups of features based on at least the multiple data values for different indices on the first and second dimensions to which the outputs relate;

form a normalization output for each group of outputs; and provide the normalization outputs as input to the second neural network layer.

2. The device as claimed in claim 1, wherein forming the normalization output for each group further comprises computing an aggregate statistical parameter over the outputs in that group.

3. The device as claimed in claim 1, wherein forming the normalization output for each group further comprises computing a mean and a variance over the outputs in that group.

4. The device as claimed in claim 1, wherein grouping the outputs further comprises allocating each output to only a single one of the groups.

5. The device as claimed in claim 1, wherein grouping the outputs further comprises allocating all outputs relating to a common point on the first dimension and to a common point on the second dimension to the same group.

6. The device as claimed in claim 1, wherein grouping the outputs further comprises allocating outputs relating to a common batch to different groups.

7. The device as claimed in claim 1, wherein grouping the outputs further comprises allocating outputs to different groups based on a point on the first dimension to which the outputs relate.

8. The device as claimed in claim 1, wherein grouping the outputs further comprises allocating outputs to different groups based on a point on the second dimension to which the outputs relate.

9. The device as claimed in claim 1, wherein the normalization layer is configured to:

receive a control parameter;

compare the control parameter to a predetermined threshold; and based on that parameter, determine how, during the grouping the outputs, to allocate outputs to different groups based on points in the first dimension and the second dimension to which the outputs relate.

10. The device as claimed in claim 9, wherein the control parameter is formed based on a number of training samples in the batch.

11. The device as claimed in claim 1, wherein the outputs are feature maps formed by the first neural network layer.

12. The device as claimed in claim 1, wherein the second neural network layer is trained based on the normalization outputs.

13. The device as claimed in claim 1, wherein, in response to a size of the batch of training samples satisfying a condition, grouping the outputs is further based on a size of the batch of training samples by selecting a grouping parameter for controlling a number of groups and/or a number of data values included in each group.

14. A method for training a device for machine learning configured to implement a deep convolutional neural network (DCNN), wherein the training occurs on a batch of training samples, wherein the DCNN comprises a first neural network layer, a second neural network layer and a normalization layer arranged between the first neural network layer and the second neural network layer, the method comprising the following operations carried out by the normalization layer:

receiving multiple outputs of the first neural network layer for a plurality of training samples of the batch of training samples, wherein the multiple outputs comprise a plurality of feature maps produced by the first neural network layer, wherein each output comprises multiple data values for indices of a feature map among the plurality of feature maps along a first dimension and a second dimension, wherein the first dimension represents a channel dimension that indexes a plurality of channels, each channel corresponding to a respective feature map in the plurality of feature maps produced by the first neural network layer, and wherein the second dimension represents at least one spatial dimension of each feature map in the plurality of feature maps, including a height dimension and/or a width dimension;

grouping the outputs into multiple groups of features based on at least the multiple data values for different indices on the first and second dimensions to which the outputs relate;

forming a normalization output for each group of outputs; and providing the normalization outputs as input to the second neural network layer.

15. The method as claimed in claim 14, wherein forming the normalization output for each group further comprises computing an aggregate statistical parameter over the outputs in that group.

16. The method as claimed in claim 14, wherein forming the normalization output for each group further comprises computing a mean and a variance over the outputs in that group.

17. The device as claimed in claim 14, wherein grouping the outputs further comprises allocating each output to only a single one of the groups.

18. The method as claimed in claim 14, wherein grouping the outputs further comprises allocating all outputs relating to a common point on the first dimension and to a common point on the second dimension to the same group.

19. The method as claimed in claim 14, wherein grouping the outputs further comprises allocating outputs relating to a common batch to different groups.

20. The device as claimed in claim 14, wherein, in response to a size of the batch of training samples satisfying a condition, grouping the outputs is further based on a size of the batch of training samples by selecting a grouping parameter for controlling a number of groups and/or a number of data values included in each group.

* * * * *